H. GUTZWILLER.
FEEDING POLYPHASE CURRENT CIRCUITS WITH MONOPHASE CURRENT.
APPLICATION FILED AUG. 5, 1918.
1,347,457.
Patented July 20, 1920.
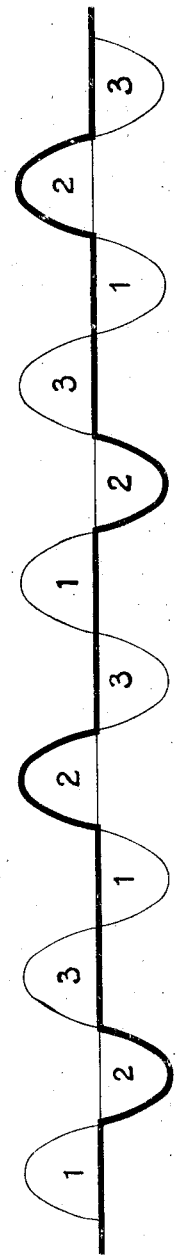
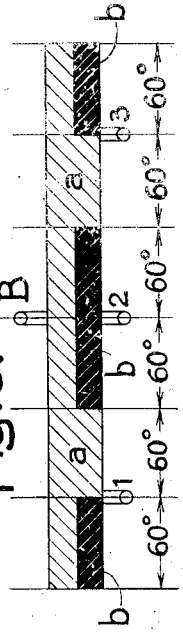
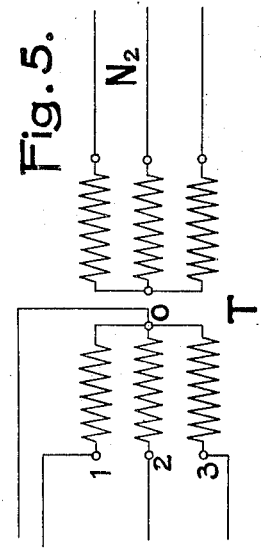
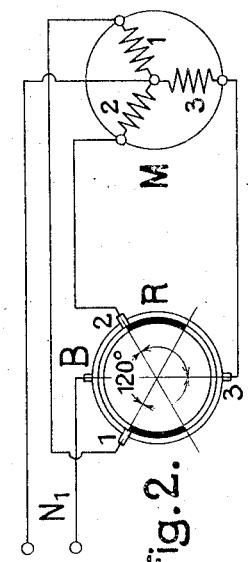
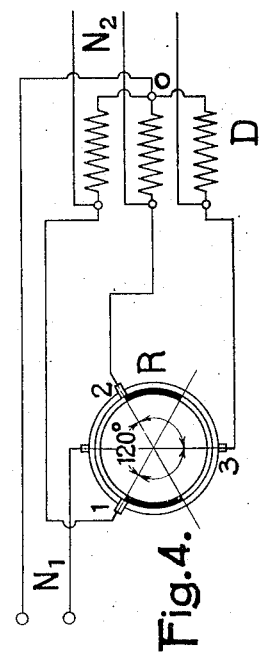
Inventor.
Herbert Gutzwiller.
by Wilkinson & Giusta.
Attorneys.

UNITED STATES PATENT OFFICE.

HERBERT GUTZWILLER, OF SCHÖNENWERD, SWITZERLAND, ASSIGNOR OF ONE-HALF TO THEOPHIL BUESS, OF LIESTAL, SWITZERLAND.

FEEDING POLYPHASE-CURRENT CIRCUITS WITH MONOPHASE CURRENT.

1,347,457.  Specification of Letters Patent.  Patented July 20, 1920.

Application filed August 5, 1918. Serial No. 248,445.

*To all whom it may concern:*

Be it known that I, HERBERT GUTZWILLER, a citizen of the Swiss Republic, and resident of Schönenwerd, Canton of Soleure, Switzerland, have invented new and useful Improvements in Feeding Polyphase-Current Circuits with Monophase Current, of which the following is a full, clear, and exact specification.

The usual current types in electric power installations are the direct current and the alternate current. The electric motor plants are mostly designed for alternate current of 40 to 50 cycles. The practice has shown that for electric railway service an alternate current of less cycles (for example 15 to 20 cycles) or direct current is preferable. In order to allow the use of the power plants designed for alternate current of 40 to 50 cycles for the purpose of electric railway service, it was hitherto necessary to build up great and expensive transformer works to convert the alternate current of 40 to 50 cycles into such of a lower number of cycles or into direct current.

According to the present invention the same object can be obtained by another way without any transformer works. Its subject is a method for feeding polyphase current circuits with monophase current, wherein the successive positive and negative half waves of the primary monophase current are separated by a current divider and distributed alternately over the $n$ phase-conductors of the polyphase current circuit, so that each of the said $n$ phase-conductors receives a partial alternate current which in the same time has $n$ times less half waves than the primary monophase current.

The accompanying diagrammatic drawing serves to illustrate the improved feeding method.

Figure 1 is the curve diagram of a split monophase current;

Fig. 2 shows a rotary current divider used in combination with the improved feeding method to supply a three-phase induction motor;

Fig. 3 is a sectional view of the circumferential development of the said current divider;

Figs. 4 and 5 show the said current divider in combination with other apparatus to be supplied.

As shown by Fig. 1, the primary monophase current can be separated or split into three partial phase currents so that a first partial phase current comprises all the half cycles 1 of the monophase current, a second partial phase current all the half cycles 2 and a third partial phase current all the half cycles 3 of the primary monophase current. The partial phase current 2 is represented in Fig. 1 by a strong line. The period of time of one cycle of the partial phase current is three times greater than that of the monophase current. If, consequently, the monophase current has for example 50 cycles per second, when using three phase conductors, the number of cycles of the partial phase currents will be of $50 \div 3 = 16\frac{2}{3}$ per second. The three partial phase currents 1, 2 and 3 are displaced one with respect to another for $\frac{1}{3}$ of cycle of the partial phase current and are therefore able to be used like ordinary three phase currents to produce rotating fields for the drive of induction motors.

The dividing of the primary monophase current into partial phase currents may be effected for example by a rotary current divider such as represented by Figs. 2 and 3.

In Fig. 2, R indicates a synchronously running current divider or contact ring, to which the primary monophase current is supplied from the line system $N_1$ by means of the brush B and from which the partial phase currents are taken off by means of the brushes 1, 2 and 3 in order to be supplied to the three-phase conductors of the receiving three-phase circuit. The development of the contact ring R with the arrangement of its brushes is shown by Fig. 3, wherein the finely hatched parts $a$ represent electric conductive, the coarsely hatched parts $b$ insulating material.

The contact-ring R makes one revolution during one cycle of the partial phase currents, or during three cycles of the primary monophase-current. It results therefrom that the driving synchronous motor running with the primary monophase current shall have three pole pairs.

The three partial phase currents can be supplied to the three phases 1, 2 and 3 of a rotating current motor M, having the common center point O of its windings connected to the back line of the monophase current system (Fig. 2). The motor runs then with the three partial phase currents of a relative displacement of $\frac{1}{3}$ of cycle with a number of revolutions which corresponds to a number of cycles reduced to $\frac{1}{3}$ of that of the primary monophase current.

Instead of supplying a rotating current motor M there may also be arranged a three-phase choke coil D (Fig. 4), to the terminals 1, 2, 3 of which a three-phase line system $N_2$ is connected. The choke coil D may also be replaced by a three-phase transformer T (Fig. 5), which allows to convert the three-phase current in the secondary system $N_2$ to any desired voltage. In the two last mentioned cases the combinations of devices R D and R T serve to convert the primary monophase current into rotating current for any desired use in distributing systems with simultaneous reduction of the number of cycles to $\frac{1}{3}$ of that of the primary monophase current.

What I claim is:

1. The combination with a monophase current feeding circuit, of a receiving circuit having $n$-phase conductors, where $n$ is odd and a current divider interconnecting said circuits and arranged so as to separate the successive positive and negative half waves of the primary monophase current and to alternately distribute the same over the $n$-phase conductors of the receiving circuit, so that in each of the $n$-phase conductors thereof there flows a partial alternate current which in the same time has $n$ times less half waves than the primary monophase current, substantially as described.

2. The combination with a monophase current feeding circuit, of a receiving circuit having $n$-phase conductors, where $n$ is odd and a rotary current divider interconnecting said circuits and arranged so as to divide the primary monophase current into three partial alternate currents having each one third of the cycle number of the primary monophase current and resulting jointly in a partial three-phase current, substantially as described.

In witness whereof I have hereunto signed my name this 29th day of June, 1918, in the presence of two subscribing witnesses.

HERBERT GUTZWILLER.

Witnesses:
H. H. DICK,
AMAND RITTER.